(12) United States Patent
Chen et al.

(10) Patent No.: US 9,348,706 B2
(45) Date of Patent: *May 24, 2016

(54) MAINTAINING A CLUSTER OF VIRTUAL MACHINES

(71) Applicant: GLOBALFOUNDRIES INC., Grand Cayman (KY)

(72) Inventors: Han Chen, White Plains, NY (US); Joachim H. Frank, Tubingen (DE); Hui Lei, Scarsdale, NY (US); E. Michael Maximilien, San Jose, CA (US); Lin Yang, Beijing (CN)

(73) Assignee: GLOBALFOUNDRIES INC., Grand Cayman (KY)

( * ) Notice: Subject to any disclaimer, the term of this patent is extended or adjusted under 35 U.S.C. 154(b) by 25 days.

This patent is subject to a terminal disclaimer.

(21) Appl. No.: 14/673,926

(22) Filed: Mar. 31, 2015

(65) Prior Publication Data

US 2015/0205683 A1      Jul. 23, 2015

Related U.S. Application Data

(63) Continuation of application No. 13/906,482, filed on May 31, 2013, now Pat. No. 9,087,005.

(51) Int. Cl.
*G06F 11/00* (2006.01)
*G06F 11/14* (2006.01)
(Continued)

(52) U.S. Cl.
CPC ........ *G06F 11/1469* (2013.01); *G06F 9/45558* (2013.01); *G06F 11/1438* (2013.01); *G06F 11/0766* (2013.01);
(Continued)

(58) Field of Classification Search
CPC ............ G06F 11/1469; G06F 11/0766; G06F 11/1438; G06F 9/45558; G06F 2009/45575; G06F 2009/45591; H04L 43/18
USPC ........................................................ 714/39
See application file for complete search history.

(56) References Cited

U.S. PATENT DOCUMENTS

| 6,581,088 | B1 | 6/2003 | Jacobs et al. |
| 7,177,950 | B2 | 2/2007 | Narayan et al. |
| 8,386,838 | B1 * | 2/2013 | Byan ................... G06F 11/1484 714/5.11 |

(Continued)

OTHER PUBLICATIONS

Li et al., Agent-Based Management of Virtual Machines for Cloud Infrastructure, Msc in Computer Science School of Informatics University of Edinburgh, Aug. 19, 2011, 47 pages.
(Continued)

*Primary Examiner* — Yair Leibovich
(74) *Attorney, Agent, or Firm* — Thompson Hine LLP

(57) ABSTRACT

A method and associated systems for monitoring and maintaining a cluster of virtual machines. The cluster contains one or more pairs of a first virtual machine and a second virtual machine, in which each machine of a pair monitors the other one machine of the pair. When a first virtual machine identifies that its corresponding second virtual machine is not operating properly, the first virtual machine automatically requests that a system-management entity restart the second machine. If a certain number of restart attempts fails to restore the second machine to desired functionality, the first virtual machine automatically requests that the system-management entity recreate or reprovision the second virtual machine from a prior backup. If a certain number of such attempts fail, a system administrator is automatically notified that further action is needed.

13 Claims, 6 Drawing Sheets

(51) Int. Cl.
*G06F 9/455* (2006.01)
*G06F 11/07* (2006.01)

(52) U.S. Cl.
CPC ............ *G06F 2009/45575* (2013.01); *G06F 2009/45591* (2013.01); *G06F 2201/815* (2013.01)

(56) References Cited

U.S. PATENT DOCUMENTS

| | | | |
|---|---|---|---|
| 9,087,005 B2* | 7/2015 | Chen | G06F 11/1438 |
| 9,223,606 B1* | 12/2015 | Vaidya | G06F 9/45558 |
| 2003/0196148 A1 | 10/2003 | Harrisville-Wolff et al. | |
| 2006/0174087 A1* | 8/2006 | Hashimoto | G06F 9/5077 711/173 |
| 2007/0233455 A1 | 10/2007 | Zimmer et al. | |
| 2007/0260723 A1 | 11/2007 | Cohen et al. | |
| 2008/0162625 A1 | 7/2008 | Sedayao et al. | |
| 2013/0080840 A1* | 3/2013 | Baba | G06F 11/3006 714/47.1 |
| 2014/0359353 A1 | 12/2014 | Chen et al. | |

OTHER PUBLICATIONS

Maximilien et al., Peer Monitoring and Recovery in Cloud Computing Environments, 7 pages, 2003.
Office Action (Jan. 14, 2015) for U.S. Appl. No. 13/906,482, filed May 31, 2013, Conf. No. 9873.
Maximilien et al., SC-ALM Monitoring, architecture and design for the monitoring feature, Friday, Apr. 20, 2012, v0.9.0, 20 pages.
Chen et al, Achieving Resilience of Cloud-Based Systems Through Lifeboat Monitoring, Alogrithms, Jan. 4, 2013, 34 pages.
Dekeyrel et al., Recover data in IBM SmartCloud Enterprise, [Retrieved on Mar. 13, 2013], Retrieved from the Internet: < URL: http://www.ibm.com/developerworks/cloud/library/cl-datarecovery/>, 14 pages.
IBM infrastructure as a service, [Retrieved on Mar. 13, 2013], Retrieved from the Internet< URL: http://www-935.ibm.com/services/us/en/cloud-enterprise/>, 2 pages.
Tivoli System Automation Application Manager, IBM, [Retrieved on Mar. 13, 2013], Retrieved from the Internet< URL: http://www.-01.ibm.com/software/tivoli/products/sys-auto-app-mgr/>, 2 pages.
Amendment (Jan. 23, 2015) for U.S. Appl. No. 13/906,482, filed May 31, 2013, Conf. No. 9873.
Notice of Allowance (Mar. 23, 2015) for U.S. Appl. No. 13/906,482, filed May 31, 2013, Conf. No. 9873.

* cited by examiner

MAINTAINING A CLUSTER OF VIRTUAL MACHINES

This application is a continuation application claiming priority to Ser. No. 13/906,482, filed May 31, 2013, now U.S. Pat. No. 9,087,005, issued Jul. 25, 2015.

TECHNICAL FIELD

The present invention relates to automating the recovery of a virtual machine from a failure condition.

BACKGROUND

When a virtual machine becomes unavailable due to a hardware, software, or communications failure, it is important to quickly detect the unavailability, diagnose the problem, and restore the virtual machine to normal operation.

BRIEF SUMMARY

A first embodiment of the present invention provides a method for increasing resiliency of a distributed computing system through lifeboat monitoring, said method comprising:

a processor of a computer system creating a first virtual machine and a second virtual machine wherein a first agent runs on the first virtual machine, a second agent runs on the second virtual machine, the first virtual machine is provisioned on a first platform, the second virtual machine is provisioned on a second platform, the first platform is distinct from the second platform, the second agent monitors a first operation of the first virtual machine, and the first agent monitors a second operation of the second virtual machine;

the processor receiving notice from the first agent that the second virtual machine is not responsive; and the processor taking steps to restart the second virtual machine.

A second embodiment of the present invention provides a computer program product, comprising a computer-readable hardware storage device having a computer-readable program code stored therein, said program code configured to be executed by a processor of a computer system to implement a method for increasing resiliency of a distributed computing system through lifeboat monitoring, said method comprising:

the processor creating a first virtual machine and a second virtual machine wherein a first agent runs on the first virtual machine, a second agent runs on the second virtual machine, the first virtual machine is provisioned on a first platform, the second virtual machine is provisioned on a second platform, the first platform is distinct from the second platform, the second agent monitors a first operation of the first virtual machine, and the first agent monitors a second operation of the second virtual machine;

the processor receiving notice from the first agent that the second virtual machine is not responsive; and the processor taking steps to restart the second virtual machine.

A third embodiment of the present invention provides a computer system comprising a processor, a memory coupled to said processor, and a computer-readable hardware storage device coupled to said processor, said storage device containing program code configured to be run by said processor via the memory to implement a method for increasing resiliency of a distributed computing system through lifeboat monitoring, said method comprising:

the processor creating a first virtual machine and a second virtual machine wherein a first agent runs on the first virtual machine, a second agent runs on the second virtual machine, the first virtual machine is provisioned on a first platform, the second virtual machine is provisioned on a second platform, the first platform is distinct from the second platform, the second agent monitors a first operation of the first virtual machine, and the first agent monitors a second operation of the second virtual machine;

the processor receiving notice from the first agent that the second virtual machine is not responsive; and the processor taking steps to restart the second virtual machine.

DETAILED DESCRIPTION

Figure 1:
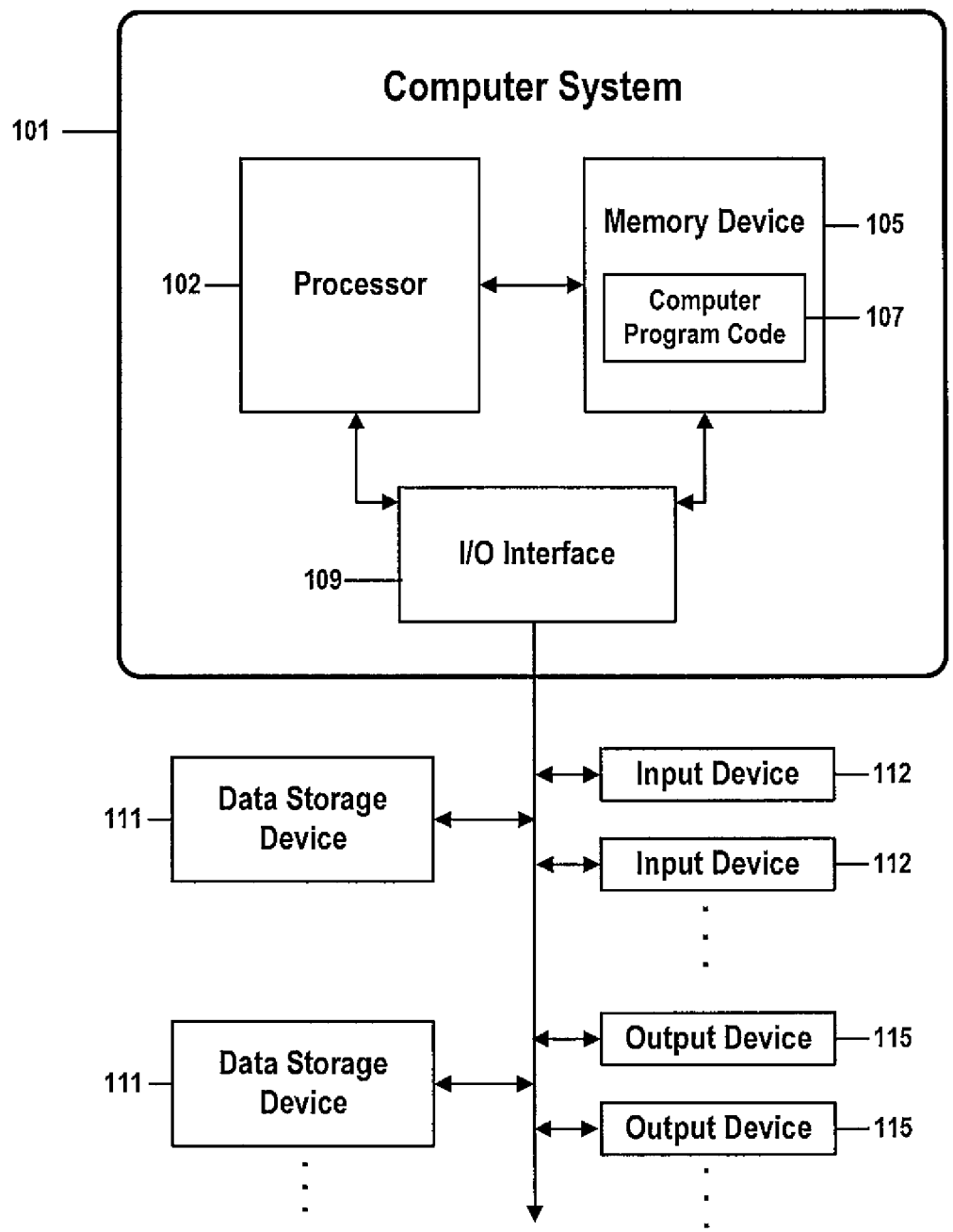
FIG. 1 shows the structure of a computer system and computer program code that may be used to implement a method for achieving resiliency of a distributed computing system through lifeboat monitoring in accordance with embodiments of the present invention.

Computer systems, applications, and networks, including Internet applications and "cloud" applications, rely increasingly on virtualization technologies that allow a physical host computer running a "hypervisor" program to host one or more "virtual" machines. These virtual machines are software-based computers that are managed by the hypervisor, but which appear to users to be like complete physical computer systems.

Like any computer program, a virtual machine may, due to a hardware, software, or communications failure, suffer from reduced performance, crash, lock up, or otherwise become unavailable or compromised. In many operating environments, it may be important to quickly detect such unavailability and restore the virtual machine to normal operation. Such a response may be performed manually by a system administrator, but automatic detection and restoration may be a better choice because an automated recovery procedure may: i) be more cost-effective; ii) guarantee faster and more consistent responses; iii) require less human intervention; and iv) be more easily scalable to larger networks.

The present invention comprises methods, systems, and programs for automatically detecting a failure of a virtual machine or other physical or virtual entity and then automatically restoring the entity to normal operation. The present invention accomplishes these tasks by configuring two entities into a pair of entities that monitor each other's availability and operation. When a first entity of such a pair detects a failure in a second entity of the pair, the first entity automatically requests that the other entity of the pair, or a third entity, address the failure.

In some embodiments, this method may further comprise a periodic, incident-triggered, or ad hoc, single or repeated, creating of or maintaining of backups of a configuration, content, or characteristic of a monitored entity or of an application that runs on the monitored entity. In other embodiments, restoration of a monitored entity may comprise steps that may include, but are not limited to, restarting a database server, launching or updating an application or operating environment, or restarting a Web server or other physical or virtual computing device.

This invention may be implemented as a method performed by a processor of a computer system, as a computer program product, as a computer system, or as a processor-performed process or service for supporting computer infrastructure.

The present invention comprises a method of designating a second "lifeboat" entity to monitor an operation of a first "workload" entity. In this document, the term "lifeboat" generally describes a monitoring entity and the term "workload" describes a monitored entity. An entity may be a virtual machine run by a hypervisor application on a physical host computer. In some embodiments, a workload entity may be comprised of multiple computing entities using one or multiple virtual machines to realize it. Embodiments of the present invention extend to other types of entities that may include, but are not limited to, physical computers, network-attached hardware devices, mobile devices, or software applications.

In some embodiments, a lifeboat entity and a workload entity may be different types of entities. If a workload entity is a virtual machine, for example, a lifeboat might comprise an external hardware or firmware, wireless or hardwire-networked, module. In another example, wherein a network might comprise a large workload server that runs a mission-critical application but has only modest resources available for monitoring purposes, a lightweight, low-overhead lifeboat virtual machine configured on a small physical device might be dedicated solely to monitoring the workload computer or the mission-critical application.

In some embodiments, a lifeboat entity and a workload entity may be physically located at two or more distinct physical sites, may run on two or more distinct hardware components, or may run under two or more distinct instances of hypervisor software. In this document, we may refer to entities distinguished by such distinctions, or by similar characteristics, as being "anti-collocated." We may refer to a pair of entities that run on a same piece of hardware, reside at a same site or on a same network, or that run under a same instance of a hypervisor, as being "collocated." When a pair of entities are not collocated, they are here referred to as being "anti-collocated."

In some cases, distinguishing collocated entities from anti-collocated entities may depend upon context, implementation details, or platform, or may be a function of whether a configuration reduces a likelihood of two entities failing simultaneously. In a wide-area network, for example, two virtual machines might be considered to be anti-collocated only if they are installed at two geographically distinct sites. But in a local-area network housed in a single room, two virtual machines might be considered to be anti-collocated if they run under different hypervisors or on physically distinct host computers.

In embodiments that integrate methods of the present invention into a "cloud application" or "cloud-computing environment," collocation may be defined differently, or in conformance with standards, procedures, or definitions known to those skilled in the relevant arts.

In some embodiments, reliability may be further increased by ensuring that a workload entity and its companion lifeboat entity run different software stacks, operating systems, hypervisors, applications, or communications protocols. In such cases, if a platform or software error makes a lifeboat entity, a workload entity, or a system-management entity unavailable, that error might not affect one or both of the other entities.

In some embodiments, a pair of "mutually monitoring" entities may each perform "mutual surveillance" lifeboat functions for its companion entity, rendering each entity of the pair both a lifeboat entity and a workload entity. In one example, if a first entity and a second entity are configured to monitor each other's operation, the second entity would be a workload machine that is monitored by the first entity, and the first entity would be a lifeboat for the second entity. But the first entity would also act as a lifeboat for the second entity, monitoring the health of the "workload" second entity. The first entity and the second entity thus mutually monitor each other.

In embodiments of the present invention, such mutual surveillance may be performed by running a lifeboat "agent" program on each entity, where a lifeboat agent running on a first entity monitors an operation, application, performance, or availability of a second entity and orchestrates a recovery or restoration of the second entity when the second entity fails.

In some embodiments, a pair of "mutually monitoring" entities may each perform both workload "production" functions and lifeboat functions. In other embodiments, only one entity of the pair may perform, or may be dedicated solely or primarily to, a lifeboat monitoring function.

In other embodiments, one lifeboat entity of the mutually-monitoring pair may not function as a workload entity, instead acting solely as a lifeboat entity for its companion mutually-monitoring entity or acting solely as a lifeboat entity for a set of other entities that includes the companion mutually-monitoring entity. Here, this one lifeboat entity may perform no function other than running a lifeboat monitoring agent.

In yet other embodiments, a group of three of more entities may be configured into workload-lifeboat pairs. In some cases, an entity may act as a lifeboat for more than one other entity of the group or may belong to more than one workload-lifeboat pair. Such configurations may be organized in a variety of ways that comprise, but are not limited to: a daisy-chain (as shown in FIG. 3C), wherein all entities other than the last entity in the chain serve as a lifeboat for the next entity in the chain, and in which one entity, other than the last entity of the chain, may further serve as a lifeboat for the first entity; and a close-ended loop (as shown in FIG. 3D), where each entity in the chain, other than the last entity in the chain, serve as a lifeboat for the next entity in the chain, and where the last entity may further serve as a lifeboat for the first entity.

In some embodiments, a lifeboat entity may itself restart, recreate, reprovision, or otherwise restore a workload entity that appears to be unavailable or otherwise compromised. In other embodiments, the lifeboat entity requests such services from a distinct system-management entity. Reliability of the methods of the present invention may be increased by anti-collocating the system-management entity such that it is not collocated with at least one of the workload and lifeboat entities, or by anti-collating the lifeboat and workload entities. This configuration increases the probability that the system-management entity will continue to operate when a hardware, software, or communications failure makes unavailable or otherwise compromises one or both of the workload and lifeboat entities.

A system-management entity may be any physical, virtual, or other entity capable of restarting, recreating, provisioning, reprovisioning, or otherwise restoring a workload entity, or of directing an other resource to restart, recreate, provision, reprovision, or otherwise restore a workload entity. In a networked environment, a system-management entity may comprise one or more servers, system-administration programs, system administrators, virtual machines, or other network-aware entities. In a cloud-computing environment, a cloud-management platform may perform a function of a system-management entity. Other types of entities, some of which may be known to those skilled in the arts, may act as a system-management entity.

When a lifeboat entity determines that a workload entity may have become unavailable or otherwise compromised, the lifeboat entity may communicate information to the system-management entity in order to facilitate the system-management entity's task of restoring the workload entity. This information may include, but is not limited to, a status of the workload entity; a failure of the workload entity to respond to pings or to an other health-checking mechanism, as described below, or to other communication requests; identifying information of the workload entity, such as an IP address or other logical address or identifier; identifying information of a stored backup of a state of, a configuration of, or content of the workload entity; or other information necessary to identify the workload entity or its original or most recent location, configuration, content, or settings.

Some embodiments of the present invention may not comprise a distinct system-management entity. In such embodiments, the lifeboat entity might perform some of or all of the tasks that would otherwise be performed by a system-management entity. These tasks might comprise attempting to restart the workload entity, attempting to recreate or to reprovision the workload entity, backing up a state of the workload entity, maintaining such a backup, and storing or maintaining a system configuration, disk image, or other information that might facilitate a restarting, creation, recreation, provisioning, reprovisioning, or other restoration of either the lifeboat entity or the workload entity. In some embodiments, a lifeboat entity may need to communicate with only the workload entity in order to address a hardware, virtual-machine, operating system, network, or application failure.

In some embodiments, a lifeboat entity or a system-management entity may maintain or identify a synchronized copy of a workload entity. In such embodiments, when the workload entity becomes unavailable or otherwise compromised, the lifeboat entity or system-management entity might automatically substitute the synchronized copy for the workload entity, rather than attempt to restart, recreate, or reprovision the workload entity. In other embodiments, when the workload entity becomes unavailable or otherwise compromised, the lifeboat entity or system-management entity might automatically redirect traffic addressed to the workload entity such that the traffic is routed instead to the synchronized copy.

In some embodiments of the present invention, the workload entity may create a companion lifeboat entity, wherein the companion lifeboat entity may monitor the availability of the workload entity and may perform other lifeboat functions for the workload entity. In other embodiments, the system-management entity may create the companion lifeboat entity. In yet other embodiments, a third entity may create the companion lifeboat entity.

In some embodiments, a lifeboat entity and its companion workload entity may, either once or repeatedly, exchange content, configuration information, or location information of the workload entity, lifeboat entity, or a system-management entity. This exchanged information may include, but is not limited to, IP addresses, port numbers, volume identifiers, instance IDs, security tokens and other settings or configuration data related to performing recovery actions. In some embodiments, this exchanged information may help the system-management entity to restart, recreate, reprovision, or otherwise restore an entity that has become unavailable or otherwise compromised.

In some embodiments, a lifeboat entity or a workload entity may determine a state of its own operating environment and communicate this information to a system-management entity or to its companion entity. Here, an operating environment may include, but is not limited to, a hardware platform, a network, an operating system, an application, or a hypervisor.

In embodiments that comprise a group of entities, a first lifeboat entity may perform lifeboat functions for more than one workload entity. In such embodiments, more than one other entities of the group may in turn perform reciprocal lifeboat functions for the first lifeboat entity, and any subset of entities of the group may be selected to perform these functions. In general, lifeboat functionality may be distributed across any combination of entities of the group, as required by the embodiment's implementation requirements or goals. Furthermore, any combination of lifeboat or workload entities may be anti-collocated as required by the embodiment's implementation requirements or goals, wherein anti-collocation is defined as in the description of FIG. 2 below.

In some embodiments, one or more groups of workload entities or lifeboat entities may be organized into a one or more hierarchies, wherein a distribution of lifeboat entities or workload entities throughout the hierarchies, or a configuration of one-to-many or many-to-one relationships among lifeboat entities and workload entities, may be functions of the embodiments' implementation requirements or goals.

In some embodiments, a workload entity and a lifeboat entity may be virtual machines configured as peers in a "cloud" application operating environment, platform, service, or infrastructure. In some embodiments that comprise a cloud or an other hosted Internet application, a lifeboat entity and a workload entity may communicate exclusively or primarily through a communications protocol such as a Hypertext Transfer Protocol (HTTP) mechanism, or a system-management entity may communicate with a lifeboat entity or with a workload entity exclusively or primarily through a communications protocol such as a Hypertext Transfer Protocol (HTTP) mechanism.

In some embodiments, methods of the present invention comprise lifeboat functionality, software, or a protocol that is specific to a particular virtual machine or to a particular "cloud" entity or class of entities, such as a particular hosted application, a particular hosted service, a particular hosted platform, or a particular hosted infrastructure. Such embodiments might not comprise generic monitoring functionality or protocols or generic recovery functionality or protocols. In some embodiments, a fixed protocol might be used throughout a subset of an embodiment, where the fixed protocol would not vary throughout the subset, and where the fixed protocol is non-generic and is tailored for use with components comprised by the subset.

FIG. 1 shows the structure of a computer system and computer program code that may be used to implement a method for achieving resiliency of a distributed computing system through lifeboat monitoring in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, in one embodiment, the present invention may take the form of a computer program product comprising one or more physically tangible (e.g., hardware) computer-readable medium(s) or devices having computer-readable program code stored therein, said program code configured to be executed by a processor of a computer system to implement the methods of the present invention. In one embodiment, the physically tangible computer readable medium(s) and/or device(s) (e.g., hardware media and/or devices) that store said program code, said program code implementing methods of the present invention, do not comprise a signal generally, or a transitory signal in particular.

Any combination of one or more computer-readable medium(s) or devices may be used. The computer-readable medium may be a computer-readable signal medium or a computer-readable storage medium. The computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium or device may include the following: an electrical connection, a portable computer diskette, a hard disk, a random access memory (RAM), a read-only memory (ROM), an erasable programmable read-only memory (EPROM or flash memory), Radio Frequency Identification tag, a portable compact disc read-only memory (CD-ROM), an optical storage device, a magnetic storage device, or any suitable combination of the foregoing. In the context of this document, a computer-readable storage medium may be any physically tangible medium or hardware device that can contain or store a program for use by or in connection with an instruction execution system, apparatus, or device.

A computer-readable signal medium may include a propagated data signal with computer-readable program code embodied therein, for example, a broadcast radio signal or digital data traveling through an Ethernet cable. Such a propagated signal may take any of a variety of forms, including, but not limited to, electro-magnetic signals, optical pulses, modulation of a carrier signal, or any combination thereof Program code embodied on a computer-readable medium may be transmitted using any appropriate medium, including but not limited to wireless communications media, optical fiber cable, electrically conductive cable, radio-frequency or infrared electromagnetic transmission, etc., or any suitable combination of the foregoing.

Computer program code for carrying out operations for aspects of the present invention may be written in any combination of one or more programming languages, including, but not limited to programming languages like Java, Smalltalk, and C++, and one or more scripting languages, including, but not limited to, scripting languages like JavaScript, Perl, and PHP. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN), a wide area network (WAN), an intranet, an extranet, or an enterprise network that may comprise combinations of LANs, WANs, intranets, and extranets, or the connection may be made to an external computer (for example, through the Internet using an Internet Service Provider).

Aspects of the present invention are described above and below with reference to flowchart illustrations and/or block diagrams of methods, apparatus (systems) and computer program products according to embodiments of the present invention. It will be understood that each block of the flowchart illustrations, block diagrams, and combinations of blocks in the flowchart illustrations and/or block diagrams of FIGS. 1-3D can be implemented by computer program instructions. These computer program instructions may be provided to a processor of a general purpose computer, special purpose computer, or other programmable data-processing apparatus to produce a machine, such that the instructions, which execute via the processor of the computer or other programmable data-processing apparatus, create means for implementing the functions/acts specified in the flowchart and/or block diagram block or blocks.

These computer program instructions may also be stored in a computer-readable medium that can direct a computer, other programmable data-processing apparatus, or other devices to function in a particular manner, such that the instructions stored in the computer-readable medium produce an article of manufacture, including instructions that implement the function/act specified in the flowchart and/or block diagram block or blocks.

The computer program instructions may also be loaded onto a computer, other programmable data-processing apparatus, or other devices to cause a series of operational steps to be performed on the computer, other programmable apparatus, or other devices to produce a computer-implemented process such that the instructions that execute on the computer or other programmable apparatus provide processes for implementing the functions/acts specified in the flowchart and/or block diagram block or blocks.

The flowchart illustrations and/or block diagrams FIGS. 1-3D illustrate the architecture, functionality, and operation of possible implementations of systems, methods and computer program products according to various embodiments of the present invention. In this regard, each block in the flowchart or block diagrams may represent a module, segment, or portion of code, wherein the module, segment, or portion of code comprises one or more executable instructions for implementing one or more specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special-purpose hardware-based systems that perform the specified functions or acts, or combinations of special-purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for achieving resiliency of a distributed computing system through lifeboat monitoring in accordance with embodiments of the present invention, and may implement other embodiments described in this specification, including the methods illustrated in FIGS. 1-3D. The data storage devices 111 may store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for achieving resiliency of a distributed computing system through lifeboat monitoring.

Any of the components of the present invention could be created, integrated, hosted, maintained, deployed, managed, serviced, supported, etc. by a service provider who offers to facilitate a method for achieving resiliency of a distributed computing system through lifeboat monitoring. Thus the present invention discloses a process for deploying or integrating computing infrastructure, comprising integrating computer-readable code into the computer system 101, wherein the code in combination with the computer system 101 is capable of performing a method for achieving resiliency of a distributed computing system through lifeboat monitoring.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

While it is understood that program code 107 for increasing resiliency of a distributed computing system through lifeboat monitoring may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for increasing resiliency of a distributed computing system through lifeboat monitoring is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Figure 2:
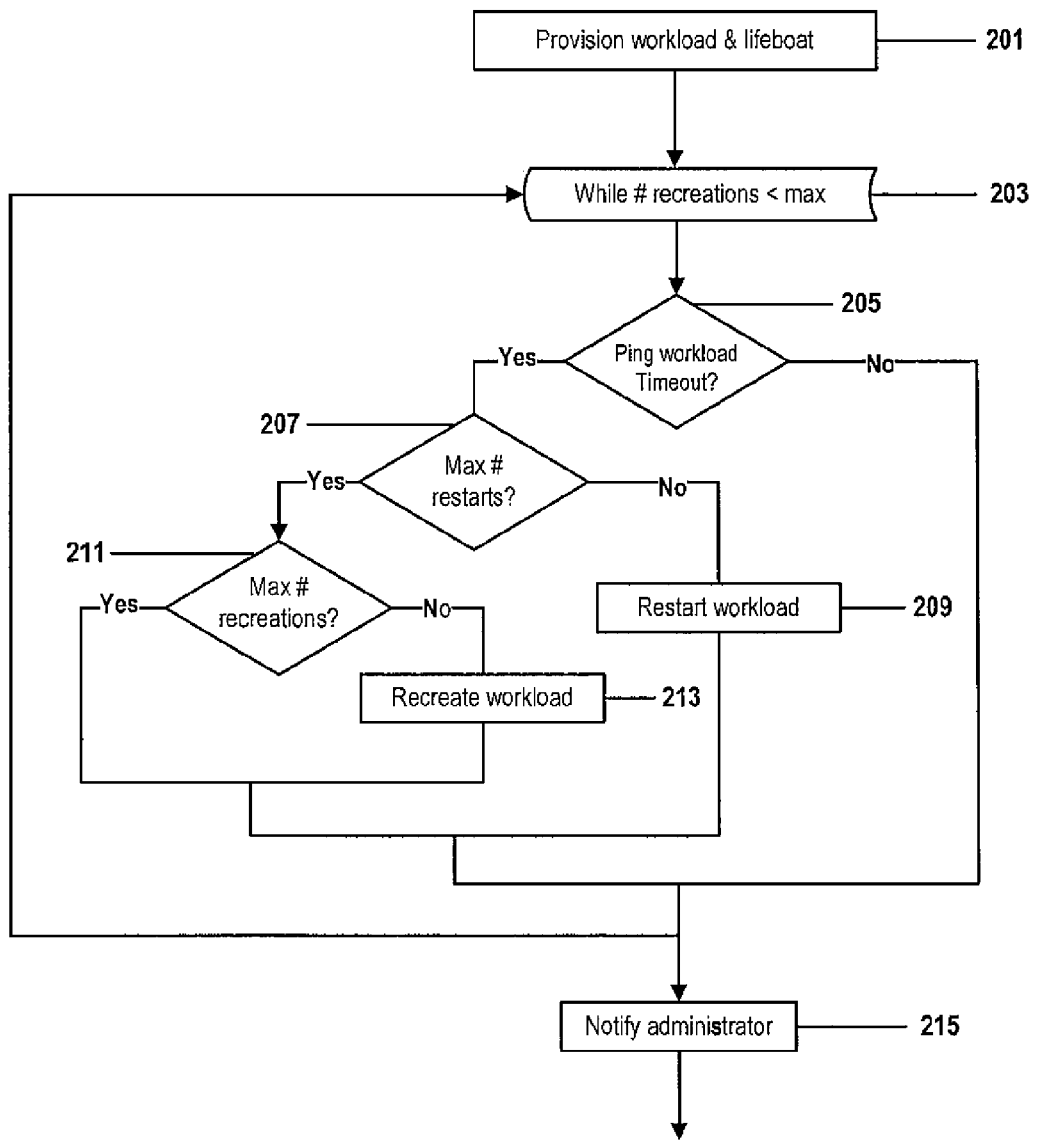
FIG. 2 is a flow chart that overviews an embodiment of the method of the present invention that comprises a workload/lifeboat pair of virtual machines.

FIG. 2 is a flow chart that overviews an embodiment of the method of the present invention that comprises a workload/lifeboat pair of virtual machines. FIG. 2 comprises steps 201-215.

Step 201 provisions or otherwise initializes a workload (or production) entity and a lifeboat entity. In one embodiment, these two entities are virtual machines that are anti-collocated, but in other embodiments, these entities may be collocated. In some embodiments, the workload entity or the lifeboat entity may be another type of entity, such as a physical computer system or a mobile device.

Here, step 201 is performed by an external processor, server, or other system-management entity, which may perform step 201 by referring to a stored system configuration or system backup that describes a setting, parameter, or other characteristic of the workload entity or of the lifeboat entity. This stored configuration or backup may be captured or otherwise created by the workload entity, by the lifeboat entity, by the system-management entity, or by some combination thereof. In some embodiments, the stored configuration or backup may be captured or otherwise created periodically, at set times, at times defined by a satisfaction of a condition, or at ad hoc times. The stored configuration or backup may be captured or otherwise created either automatically or by an operator, user, or administrator through a manual or partially automated procedure.

In some embodiments, a workload entity may create its own lifeboat entity or may participate in some way in the creation of its own lifeboat entity. In some embodiments, a third-party entity may create the lifeboat entity at the direction of the workload entity, the system-management entity, or some other entity or system administrator. In some embodiments, when a workload entity is to be restarted, recreated, or reprovisioned, this task may be performed, controlled, or directed by a third-party entity distinct from the lifeboat entity, the workload entity, and the system-management entity.

In embodiments of FIG. 2, the lifeboat entity may monitor the health of the workload entity by "pinging" the workload entity at certain times and then waiting for the workload entity to respond to each ping. A "ping" may be a message sent by the lifeboat entity to the workload entity as a means of requesting a response. If the lifeboat entity receives a proper or expected response from the workload entity within a threshold "timeout" period, then the lifeboat entity may determine that the workload entity has not become unavailable or may determine that the workload entity has not become otherwise compromised. Embodiments of the present invention may use any type of ping mechanism known to those skilled in the relevant arts.

In other embodiments of the present invention, the lifeboat entity, components of its operating environment, components of its network or communications environment, or other hardware or software entities, may supplant or complement the lifeboat entity's ping mechanism for determining if the workload entity has become unavailable. In some cases, this determining may comprise requesting the system-management entity to provide a status of the workload entity. In some embodiments, the lifeboat entity may rely on multiple sources, mechanisms, or procedures in order to determine or confirm that the workload entity has become unavailable or is likely to have become unavailable. In some embodiments, a workload entity that is experiencing slower performance may be determined to have become unavailable or compromised.

In some embodiments, a lifeboat entity monitors a workload entity by running or otherwise invoking a monitoring agent, which may be a local or shared software program or other logical or physical entity that performs monitoring functions.

The lifeboat entity and the workload entity may each run or otherwise comprise a monitoring agent. In some embodiments, the lifeboat entity's agent may be identical to or functionally similar to the workload entity's agent, but in other embodiments, these agents may comprise different feature sets or other different characteristics. In one example, one agent may perform active monitoring functions, and the other agent may perform passive monitoring functions, as described below in the description of "active/passive" ping mechanisms.

A monitoring agent or lifeboat entity may organize its functionality into four phases: i) startup, wherein the agent is initialized, loaded, or configured; ii) steady state, wherein the agent continuously or periodically monitors the availability, performance, or an other characteristic of the monitored entity; iii) restart, wherein the agent restarts, initializes, or resumes the monitored entity, or directs another entity to restart the monitored entity, after determining that the monitored entity has become unavailable or otherwise compromised; and iv) recreate, wherein the agent recreates or reprovisions the monitored entity, or directs another entity to recreate or reprovision the monitored entity, after determining that the monitored entity cannot be restarted by steps of phase iii) above.

A monitoring agent may perform some of these tasks by means of a "ping" (or "heartbeat") function, feature, program, device, or other logical entity. The ping mechanism may perform its tasks by transmitting pings to the monitored workload entity, and the timing of the transmissions may be a function of parameters passed to the lifeboat entity's monitoring agent by the lifeboat entity, by the system-management entity, or by another entity, or may be a function of a design characteristic or a goal of the agent or of the agent's environment.

If the workload entity is a physical device, such as a physical computer or discrete module, restarting the workload entity, as described in this document, may entail rebooting the computer, and recreating the workload entity, as described in this document, may entail restoring the computer's disk image, storage state, memory state, or other characteristic to a previously backed-up or otherwise previously defined state or configuration. In some embodiments, creation, restoration, or maintenance of such backups may be performed, controlled, or directed by a third-party entity.

In some embodiments, a pair of entities that perform lifeboat functions for each other may use an "active/passive" ping mechanism, wherein a first entity of the pair or a first monitoring agent of the first entity monitors an availability of the second entity through means of an "active ping" mechanism; but the second entity of the pair or a second monitoring agent of the second entity monitors the availability of the first entity through means of a "passive ping" mechanism.

In an active/passive ping mechanism, a ping may take a form that includes, but is not limited to, any of those described above, or that is known to those skilled in the relevant arts. Such a form may comprise, but is not limited to, a communication of a signal, an electronic time/date, or other information, or that comprises a setting or alteration of a parameter, device, or storage location to a particular value, state, or class of states.

Here, most of the ping mechanisms described above are examples of an "active" ping mechanism, where a first "lifeboat" or other monitoring entity actively "pings" a second "workload" entity with a request for a response. The actively pinging first entity may determine that the second entity is, or is likely to be, unavailable or otherwise compromised if the second entity does not respond to an active ping in an expected or desirable manner, where that response may include, but is not limited to, failing to respond properly to a ping within a certain time, failing to respond properly to a certain number of pings, or failing to respond properly to a certain pattern of one or more pings or one or more types of pings.

In embodiments that comprise an active/passive ping mechanism, the second, "passive," lifeboat entity may not use an active ping mechanism in order to determine whether the first, "active," lifeboat entity has become unavailable or otherwise compromised. Instead, the second entity may monitor the availability or health of the first entity through a "passive" ping mechanism, in which the second entity monitors a ping activity of the first entity. This passive monitoring may include, but is not limited to, monitoring when the second entity receives pings from the first entity, or monitoring the types of pings that the second entity receives from the first entity.

If, for example, the second entity knows that the first entity transmits an active ping at fixed times or at fixed intervals of time, the second entity may determine that the first entity has become or may have become unavailable or otherwise comprised if the second entity does not detect a ping transmission from the first entity at a certain time or after a certain period of time has elapsed, where the certain period of time is a function of the fixed interval of time.

In an other example of a passive ping mechanism, if the second entity knows that the first entity transmits an active ping at a fixed interval of time after receiving a ping response from the second entity, the second entity may determine that the first entity has become unavailable or otherwise compromised if a certain multiple of the fixed interval of time passes without receiving a ping from the first entity.

The second entity may use other passive ping criteria to determine, without transmitting a ping to the first entity, whether the first entity's active-ping behavior indicates that the first entity is unavailable or otherwise compromised. The second entity may, for example, determine that the first entity is unavailable if the first entity fails to acknowledge a certain number, type, or pattern of reiterations of the second entity's response to the first entity's most recent ping. In other embodiments, the second entity may determine that the first entity is unavailable if the first entity does not change its ping-transmission behavior in a certain way after the first entity fails to receive an expected response from the second entity. In some cases, a second entity may be able to use these or similar techniques to determine whether the first entity correctly distinguishes between a network failure and a failure of the second entity.

Step 203 initiates an iterative loop of steps 205-213, which may continue until the loop identifies that an unavailable or otherwise compromised workload entity cannot be restored through the procedure of the iterative loop.

In embodiments of the present invention, this identification may occur when step 211 determines that a maximum number of workload-entity recreations have not successfully restored the workload entity to availability. In other embodiments, this identification may be a function of other criteria, parameters, events, threshold values, or other determining factors.

If the iterative loop of steps 205-213 identifies an unavailable or otherwise compromised workload entity that cannot be restored through the procedure of the iterative loop, the iterative loops ends and the method of FIG. 2 continues with step 215.

In step 205, the lifeboat entity pings the workload entity and determines whether a "timeout" condition occurs in response to the ping. Here, a timeout condition may comprise a failure of the workload entity to respond to the ping after a certain period, a failure of the workload entity to respond properly to the ping, a failure of the workload entity to respond properly to the ping after a certain period of time, or an occurrence of an other condition that may indicate that the workload entity is unavailable, is suffering from compromised performance, or otherwise does not satisfy a desired condition. In an embodiment that comprises a passive ping mechanism, a timeout may comprise a failure of a ping to be detected at an expected time, with an expected frequency, or in an expected pattern.

Step 205 may determine whether a timeout condition exists after identifying or characterizing responses to a plurality of pings. In some embodiments, step 205 may make this determination when the workload entity does not respond in a desired way a certain number of times, does not respond in a desired way to any ping of a sequence of pings, to all pings of a sequence of pings, or to a subset of pings of the sequence of pings.

In some embodiments, if a workload entity fails to respond in an expected manner to a lifeboat entity's ping, the lifeboat may continue to communicate "optimistic" pings to the workload entity. This may occur during or after an occurrence of a certain number of, or of a certain pattern of, failed attempts to restart, recreate, reprovision, or otherwise restore the workload entity. Here, optimistic pings may help distinguish between a network failure and a true failure of a workload entity, where it might otherwise be difficult to identify, while the network failure persists, whether the failure to restart, recreate, reprovision, or otherwise restore the workload entity was the result of the network failure. If the lifeboat entity eventually receives a desired response to an optimistic ping from the previously unavailable workload entity, the lifeboat may use this response to determine that the workload entity's previous unavailability was due solely to the network failure and, now that the network failure has been resolved, the workload entity is now available. In response to this determination, the lifeboat entity or the system-management entity may take steps to avoid performing an unnecessary restarting, recreation, reprovisioning, or other restoration function upon the workload entity.

In some embodiments, this distinguishing may comprise further monitoring a network status, which may include monitoring a lifeboat entity's ability to communicate with an other network-attached entity, in addition to monitoring a status of the workload entity status or a status of an other network-attached entity. In such cases, step 205 may delay its determination that a timeout condition has occurred until it identifies that the lifeboat entity has not responded in an expected way to a certain number of, a certain type of, or a certain pattern of optimistic pings. In such embodiments, the iterative loop of steps 205-213 may continue through one or more additional iterations while the lifeboat continues to send or direct optimistic pings to the workload entity despite a previous lack of desired response from the workload entity.

In some embodiments, even if the system-management entity fails to receive a request for workload restart, workload reprovisioning, or workload recreation sent by the lifeboat entity in step 209 or in step 213 fails because of an other failure, which may include, but is not limited to, an outage of the system management entity or an outage of the network, then the method of FIG. 2, may continue, after a pause, to perform the procedure of steps 207-213 in order to attempt to restart, reprovision, or recreate the workload entity. During the pause, the lifeboat entity may continue to send "optimistic pings" to the workload entity (that is, without expecting a response). If a timeout condition was caused by an other problem other than a full or partial failure of the workload entity, such as a communications interruption, then only after the other problem is resolved will the workload entity be able to ability to respond to optimistic pings and only after the other problem is resolved will it be possible for the lifeboat entity to receive responses sent by the workload entity. At that point, in this embodiment, the method of FIG. 2 will resume its previous ping-and-response mechanism. This wait-and-retry embodiment of the "optimistic ping" mechanism thus prevents the system-management entity from attempting to restart, reprovision, or recreate the workload entity unnecessarily because of a communications or other failure.

Embodiments of the present invention may comprise many other types of optimistic or persistent ping techniques, alone or in combination, some of which may be known to those skilled in related arts. In some embodiments, optimistic pinging may be used in combination with either active ping or passive ping methods.

When step 205 considers a response of a workload entity to a plurality of pings, the plurality of pings may comprise only one type of ping event. In some embodiments, however, the plurality of pings may comprise different types or classes of ping events, and the different types or classes of events comprised by the plurality of pings may be ordered or timed, either conditionally or as a function of a condition, event, or other parameter, so as to assist the lifeboat entity in making the determination of step 205.

If step 205 determines that a timeout condition has occurred, steps 207-213 are performed. If step 205 determines that a timeout condition has not occurred, then the current iteration of the iterative process of steps 203-213 ends and the next iteration begins.

In certain embodiments, even if step 205 determines that a timeout condition has occurred, steps 207-213 may not be performed, the current iteration of the iterative process of steps 203-213 may end, and the next iteration of the iterative procedure of steps 203-213 may begin. In such embodiments, step 205, rather than directing the method of FIG. 2 to perform steps 207-213 to restore a possibly unavailable workload entity, merely records its determination that a timeout condition may have occurred and considers this recorded determination the next time step 205 is performed. Such steps may be taken, for example, in embodiments that comprise an "optimistic ping" feature described above.

In some embodiments, the method of FIG. 2 performs steps 207-213 when sequential or nonsequential iterations of step 205 have accumulated a certain number of, or a certain pattern of, determinations of certain combinations of, or certain types of, timeout conditions. In such cases, until such conditions are met, the iterative process of steps 205-213 may continue to send optimistic pings, or other steps may be performed, even after a timeout condition has been determined. Such features may facilitate more accurate distinguishing between a true workload-entity problem and an other type of problem, such as a network failure or a failure of an intermediate entity. If an unavailability or other compromised performance of a workload entity is caused by a disruptive event or condition event similar to a network outage, the optimistic pings issued until the next successful restart, reprovisioning, or recreation will allow the workload entity to resume normal operation when the network outage or similar disruptive event or condition ends. If the unavailability or other compromised performance of the workload entity was not caused by a disruptive event or condition event similar to a network outage network, the optimistic pings will not succeed after the disruptive event or condition ends, and the procedure of FIG. 2 will continue attempting to restore proper functioning of the workload entity as described above.

Step 207 determines whether the workload entity has been sequentially or nonsequentially restarted more than a threshold maximum number of restarts. If the workload entity is a virtual machine, a restart might be performed by a hypervisor program. If the workload entity is a physical computer, a restart might be performed through an automatic or manual physical process. Other types of restart mechanisms are possible, depending upon a particular embodiment's implementation details or upon a characteristic of the workload entity.

If step 207 determines that the workload entity has been restarted more than the threshold number of restarts, or in a way that satisfies or does not satisfy some other condition, then steps 211-213 are performed. If step 207 determines that the workload entity has not been restarted more than the threshold number of restarts, or in a way that satisfies or does not satisfy some other condition, then step 209 is performed.

In some embodiments, step 207 and the method of FIG. 2 would continue immediately to step 211. Such embodiments would attempt to recreate or reprovision an unavailable or otherwise compromised workload entity without attempting to restart the entity.

In some embodiments, step 207 makes a determination to perform steps 211-213 instead of step 209 as a function of a different set of criteria, where the different set of criteria identifies or characterizes a condition wherein restarting the workload entity is not sufficiently likely to restore the workload entity to a desired level of availability.

Step 209 is performed by the method of FIG. 2 when step 207 determines that the workload entity has not been restarted more than the threshold number of restarts, or in a way that satisfies or does not satisfy some other condition.

In step 209, the lifeboat entity communicates a request to the system-management entity to restart the workload entity or to direct an other entity to take a step directed toward restarting the workload entity. In some embodiments, the lifeboat entity also reports to the system-management entity a determination of step 205 that the behavior of the workload entity has created or implied a timeout condition, or that the behavior of the workload entity has otherwise identified or implied that the workload entity is unavailable or otherwise compromised.

Upon the conclusion of step 209, the current iteration of the iterative process of steps 203-213 ends and the next iteration begins.

If step 207 determines that the workload entity has been restarted more than the threshold number of restarts, or in a way that satisfies or does not satisfy some other condition, then steps 211-213 are performed.

Step 211 determines whether the workload entity has been recreated or reprovisioned more than the threshold number of times, or in a way that satisfies or does not satisfy some other condition. If step 211 determines that the workload entity has not been recreated or reprovisioned more than the threshold number of recreations or reprovisionings, then step 213 is performed.

In some embodiments, the method of FIG. 2 would skip steps 211 and 213, and the current iteration of the iterative procedure of steps 203-213 would end when step 207 determines that the workload entity has been sequentially or nonsequentially restarted more than a threshold maximum number of times. Such embodiments would not attempt to recreate or reprovision an unavailable or otherwise compromised workload entity.

If step 211 determines that the workload entity has been recreated or reprovisioned more than the threshold number of times, or in a way that satisfies or does not satisfy some other condition, then the iterative process of steps 203-213 ends and step 215 is performed. Otherwise, step 213 is performed.

In step 213, the lifeboat entity communicates a request to the system-management entity to recreate or reprovision the workload entity or to direct an other entity to take a step directed toward recreating or reprovisioning the workload entity. In some embodiments, the lifeboat entity also reports to the system-management entity a determination of step 211.

Step 213 is performed by the method of FIG. 2 when step 211 determines that the workload entity has been recreated or reprovisioned more than the threshold maximum number of recreations or reprovisionings.

In step 213, the lifeboat entity communicates a request to the system-management entity to recreate or reprovision the workload entity. In some embodiments, the lifeboat entity also reports to the system-management entity the determination of step 205 that the behavior of the workload entity has created or implied a timeout condition, or that the behavior of the workload entity has identified or implied an unavailability of the workload entity.

If the workload entity is a virtual machine, a recreation or reprovisioning might comprise a function performed by a hypervisor program, an operating system, or an application running on a physical host computer. If the workload entity is a physical computer, a recreation might be performed through an automatic or manual hard reboot, a step of fully or partially restoring the workload entity to factory settings, or a full or partial restoration from a stored backup. Other types of recreation or reprovisioning mechanisms are possible, depending upon a particular embodiment's implementation details or upon a characteristic of the workload entity.

Upon the conclusion of step 213, the current iteration of the iterative process of steps 203-213 ends and the next iteration begins. In some embodiments, steps 211-213 may be performed after a pause, in order to allow a restart, recreation, reprovisioning, or other restoration function time to complete. In some cases, the duration of the pause may be parameterized as a "level of patience," that is determined as a function of other qualities of the embodiment.

Step 215 is performed when step 203 determines that the workload entity has been recreated or reprovisioned more than a threshold maximum number of times, or in a way that satisfies or does not satisfy some other condition.

Step 215 notifies a system administrator or other system-management entity that the workload entity cannot be made available through a restart, recreation, reprovisioning, or other automated step of a method of FIG. 2. The system administrator may respond in a manner determined by a priority, configuration, or other detail of an implementation of the embodiment.

In some embodiments, step 215 may comprise a more complex notification process, where step 215 responds to a failure to contact the system administrator or other system-management entity by performing an auxiliary procedure. This auxiliary procedure may comprise rules for performing repeated attempts to contact the system administrator or other system-management entity, attempting to contact the system administrator or other system-management entity through a different method, attempting to contact a different system administrator or system-management entity, or attempting to use a different communication mechanism to contact one or more system administrators or other system-management entities. If a certain condition has been satisfied, the auxiliary procedure may confirm that the need to notify a system administrator or other system-management entity still exists before further attempting to contact the system administrator or other system-management entity.

In some embodiments, the more complex notification process may be a function of a set of locations of one or more lifeboat entities, of one or more workload entities, of one or more system-management entities, or of one or more system administrator or other system-management entities. In such embodiments, characteristics of these locations, may comprise, but are not limited to, whether certain pairs of related entities may be considered to be collocated.

Figure 3A:
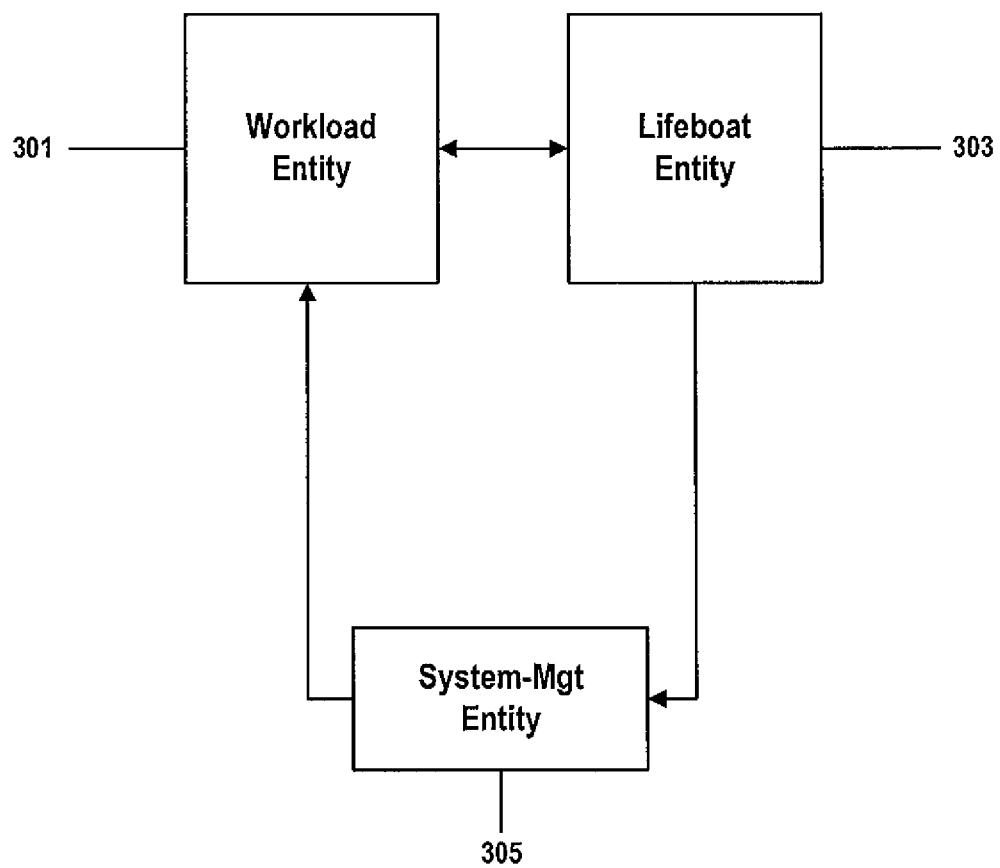
FIG. 3A shows the topology of a single-lifeboat embodiment of the present invention.

FIG. 3A shows the topology of a single-lifeboat embodiment of the present invention. FIG. 3A comprises items 301-305.

Item 301 is a workload entity, which may be a virtual machine, physical computing device, or any other type of workload entity described above.

Item 303 is a lifeboat entity, which may be a virtual machine, physical computing device, or any other type of lifeboat entity described above.

Item 305 is a system-management entity, which may be a virtual machine, a computer system, an other physical or logical computing device, or any other type of system-management entity described above or in FIGS. 1-2.

In some embodiments, workload entity 301 and lifeboat entity 303 may be anti-collocated, as described above. By ensuring that these two entities are not collocated in a way that would make them vulnerable to simultaneous or concurrent failures, embodiments of the present invention may increase the ability of methods described herein to withstand catastrophic failures. In some embodiments, this goal may be furthered by configuring system-management entity 305 to be anti-collocated with either or both of entities 301 and 303.

In the embodiment of FIG. 3A, workload entity 301 is actively monitored by lifeboat entity 303. Here, lifeboat 303 may not devote significant resources to any function or application other than the lifeboat functionality, as described above and in FIG. 2. Lifeboat 303 may therefore be a resource-efficient entity, such as a virtual machine, a small physical computer, a mobile device, or a special-purpose hardware or software device based on an embedded processor or other platform.

In some embodiments of FIG. 3A, the lifeboat 303 may be a more robust entity and, in such cases, the lifeboat 303 may devote only a small part of its resources to the performance of its lifeboat functionality.

In embodiments shown in FIG. 3A, workload entity 301 does not monitor lifeboat 303 and does not perform the lifeboat functionality described above and in FIG. 2. These embodiments are thus asymmetric, where lifeboat 303 actively monitors the availability of workload entity 301, but workload 301 does not monitor lifeboat 303. In other words, FIG. 3A illustrates a single-lifeboat embodiment that comprises one-way peer-monitoring.

As described in FIG. 2, if lifeboat entity 303 determines that workload entity 301 is likely to have become all or partially unavailable or otherwise compromised, lifeboat 303 will request restart, recreation, or reprovisioning services from the system-management entity 305, in conformance with the methods of FIG. 2.

In embodiments of FIG. 3A, there may be no need for system-management entity 305 to send communications to lifeboat entity 303. In some embodiments, these two entities may, however, engage in two-way communications for related or unrelated purposes, such as to comply with a handshaking step of a communications protocol.

In some embodiments of FIG. 3A, lifeboat entity 303 may be monitored by another entity not shown in FIG. 3A.

Figure 3B:
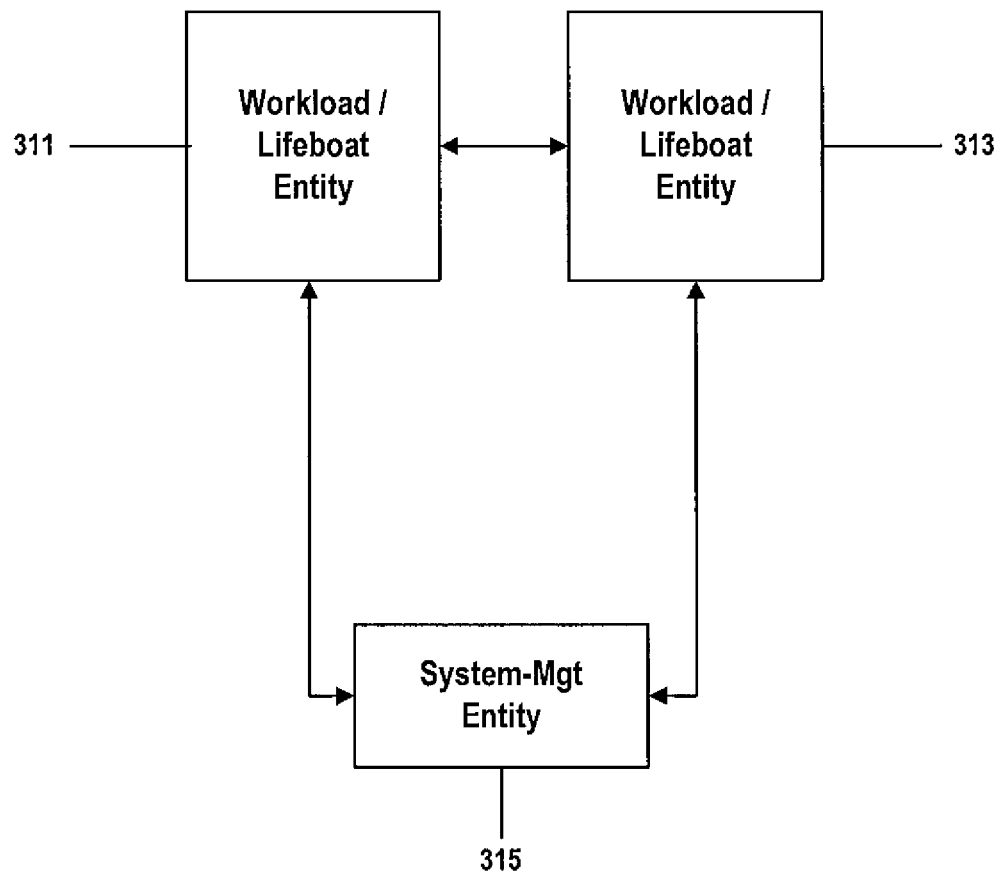
FIG. 3B shows the topology of a paired-lifeboat embodiment of the present invention.
Figure 3C:
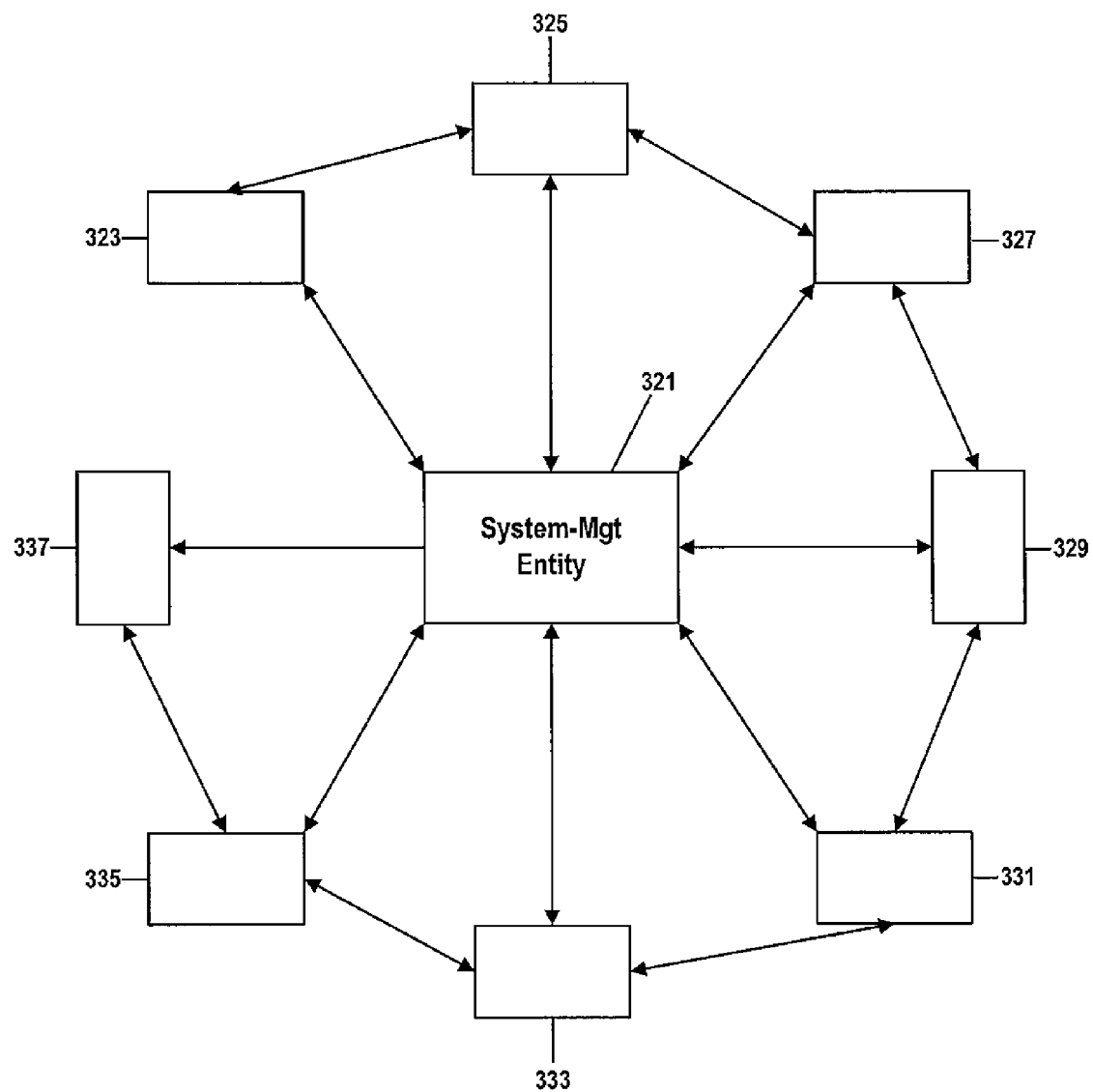
FIG. 3C shows the topology of an embodiment of the present invention that comprises eight workload entities arranged in a daisy-chain configuration.
Figure 3D:
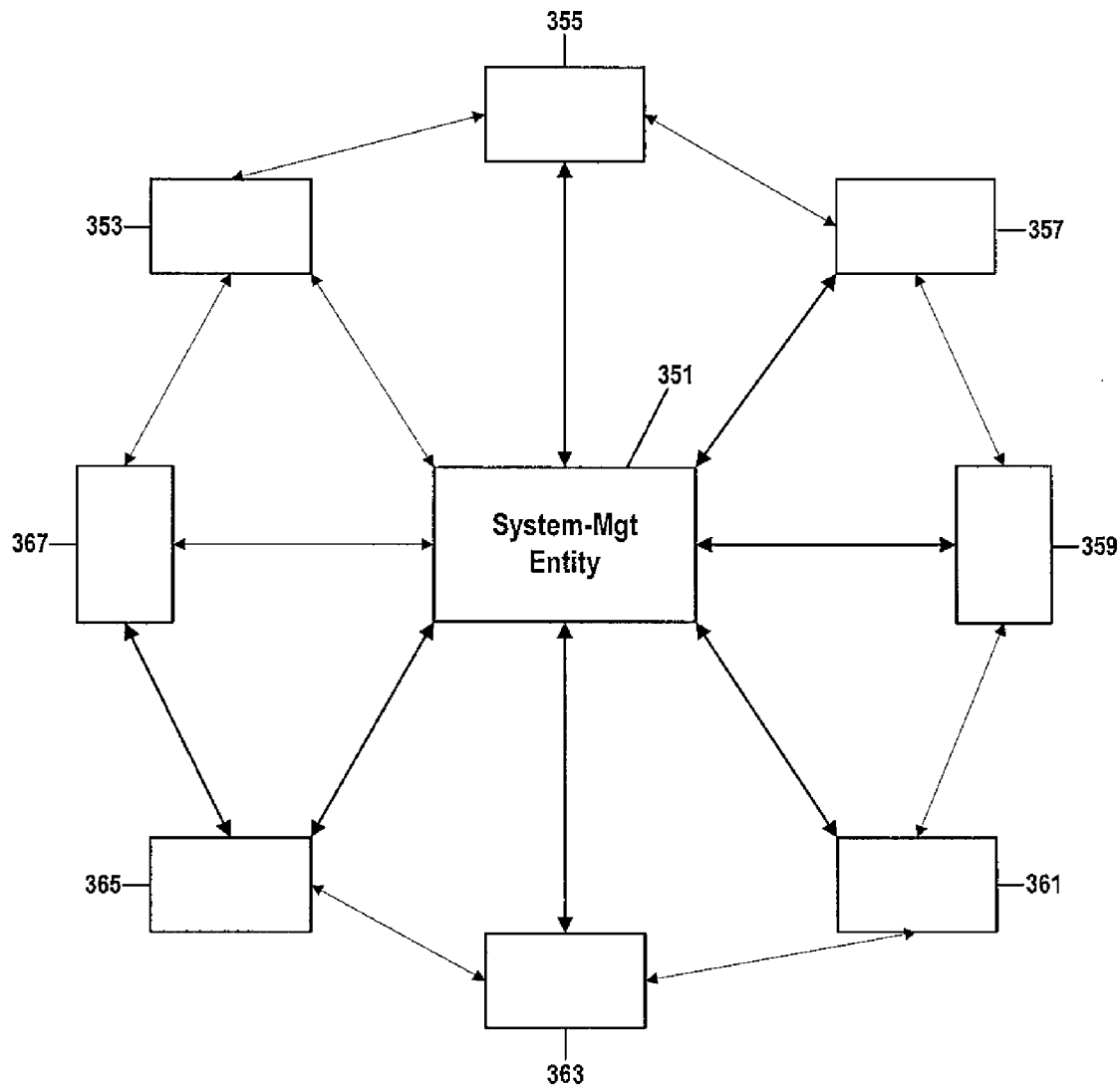
FIG. 3D shows the topology of an embodiment of the present invention that comprises eight dual workload/lifeboat entities arranged in a closed-loop or close-ended loop configuration.

FIG. 3B shows the topology of a paired-lifeboat embodiment of the present invention. FIG. 3B comprises items 311-315.

Item 311 is a first dual workload/lifeboat entity, which may be a virtual machine, physical computing device, or any other type of workload entity or lifeboat entity described above.

Item 313 is a second dual workload/lifeboat entity, which may be a virtual machine, physical computing device, or any other type of workload entity or lifeboat entity described above.

Item 315 is a system-management entity, which may be a virtual machine, a computer system, an other physical or logical computing device, or any other type of system-management entity described above or in FIGS. 1-2.

In the embodiment of FIG. 3B, both first entity 311 and second entity 313 may function as production workload entities that perform functions, or run software, other than those associated with the lifeboat functionality described above and in FIG. 2. Both first entity 311 and second entity 313 may further function as lifeboat entities that perform functions, or run software, associated with the lifeboat functionality described above and in FIG. 2.

FIG. 3B thus depicts a two-way peer-monitoring embodiment, where first entity 311 acts as a lifeboat for second entity 313 and second entity 313 acts as a lifeboat for first entity 311. Each of 311 and 313 may monitor the availability or health of its companion and each of 311 and 313 may communicate bidirectionally with system-management entity 315, as described above and in FIG. 2, when necessary to restart, recreate, or reprovision its companion entity.

Some embodiments of FIG. 3A, may perform this two-way monitoring through an active/passive ping mechanism, as described above. In such embodiments, either entity 311 or entity 313 may be the active lifeboat entity. In some cases, entities 311 and 313 may swap their active/passive roles as a function of changing conditions or as a function of a system-implementation detail.

When acting as lifeboat, either 311 or 313 may request services from system-management entity 315, and system-management entity 315 may send information to either first entity 311 or to second entity 313 as necessary in order to restart, recreate, or reprovision its companion entity.

Unlike the embodiment of FIG. 3A, bidirectional communications are usually necessary between system-management-entity 315 and both first entity 311 and second entity 313, because both 311 and 313 perform lifeboat functions that may require them to send service requests to system-management entity 315, which might respond with system-management entity 315 sending information to either one of the entities 311 or 313. One exception occurs in the set of embodiments where system-management entity 315 does not directly pass information to a workload entity 311 or 313 in order to perform a restart, recreate, or reprovision function.

In other ways, embodiments of FIG. 3B conform to the method of FIG. 2 similar to the ways that embodiments of FIG. 3A conform to the method of FIG. 2.

FIG. 3C shows the topology of an embodiment of the present invention that comprises eight workload entities arranged in a daisy-chain configuration. FIG. 3C comprises items 321-337.

Item 321 is a system-management entity, which may be a virtual machine, a computer system, an other physical or logical computing device, or any other type of system-management entity described above or in FIGS. 1-2.

Items 323-337 are a plurality of eight workload entities, and each workload entity of the plurality 323-337 may be a virtual machine, physical computing device, or any other type of workload entity described above. Here, 323 is a first workload entity, 325 is a second workload entity, 327 is a third workload entity, and so forth across the daisy chain. 337 is the eighth and last workload entity in the topology.

Here, each of the first seven workload entities 323-335 is also a lifeboat entity that monitors an availability or an other characteristic of a next entity in the chain. The first workload entity 323, for example, uses a lifeboat functionality to monitor an availability or an other characteristic of the second workload entity 325. The second workload entity 325, in turn, uses a lifeboat functionality to monitor an availability or an other characteristic of the third workload entity 327, and so forth.

Because there is no direct linkage between the first workload entity 323 and the last workload entity 337 in this figure, the last workload entity 337 cannot monitor the first entity 323. However, because the second entity 325 is in direct communication with the first entity 323, second entity 325 may in some embodiments perform lifeboat monitoring on the first workload entity 323.

In such a case, the first entity 323 and the second entity 325 may be configured much like the entities 311 and 313 in FIG. 3B. In such a case, the first entity 323 and the second entity 325 may both use an active monitoring technique, as described above, or may use an active/passive technique described in step 201. But even in this case, an other pair of entities in the daisy chain that do not implement reciprocal lifeboat peer-monitoring techniques may not use active/passive lifeboat techniques, wherein the reciprocal techniques would comprise a feature of a pair of entities performing lifeboat functionality for each other.

Each of the first seven daisy-chained entities 323-335 may communicate bidirectionally with system-management entity 321, as did the workload/lifeboat entities of FIG. 3B. Because last entity 337 does not perform lifeboat functions, there may be no need for 337 to transmit information to system-management entity 321. In some embodiments, however, bidirectional communication may nonetheless exist between last entity 337 and system-management entity 321 for purposes related or unrelated to an embodiment of the present invention.

The topology of FIG. 3C may be scaled up to any number of workload/lifeboat entities by increasing the number of daisy-chained entities between the first entity 323 of the daisy chain and the last entity 337 of the daisy chain. System-management entity 321 may comprise combinations of more than one processor, virtual machine, or other types of entity as necessary to properly manage or maintain the workload and lifeboat entities with which it communicates.

Entities shown in FIG. 3C may be anti-collocated for reasons that may comprise, but are not limited to, increasing reliability, resiliency, performance, efficiency, or robustness of an embodiment or application of the present invention.

In some embodiments, each pair of workload/lifeboat entities comprised by two adjacent entities of the daisy chain of FIG. 3C might be anti-collocated. In other embodiments, each workload entity 323-337 might be anti-collocated with any other workload entity 323-337, or with the system-management entity 321. In yet other embodiments, a subset of entities 321-337 might be anti-collocated with other entities, including other entities not shown in FIG. 3C, other entities that do not perform lifeboat functions, or other entities not comprised by the topology of FIG. 3C, when an entity of these other entities might comprise sufficient resources to potentially perform lifeboat functions. Many other anti-collocation strategies are possible.

In other ways, embodiments of FIG. 3C may conform to methods of the present invention described above and in FIGS. 1-3B.

FIG. 3D shows the topology of an embodiment of the present invention that comprises eight dual workload/lifeboat entities arranged in a closed-loop or close-ended loop configuration. FIG. 3D comprises items 351-367.

Item 351 is a system-management entity, which may be a virtual machine, a computer system, an other physical or logical computing device, or any other type of system-management entity described above or in FIGS. 1-2.

Items 353-367 are a plurality of eight workload entities, and each workload entity of the plurality 353-367 may be a virtual machine, physical computing device, or any other type of workload entity described above. Here, 353 is a first workload entity of the loop, 355 is a second workload entity of the loop, 357 is a third workload entity of the loop, and so forth across the loop. 367 is the eighth and last workload entity of the loop. This numbering convention, however, is arbitrary and is used in this document for the sake of clarity and consistency. Any entity of the plurality of workload entities 353-367 be deemed a first, second, or last entity of the loop.

Here, each of the workload entities 353-367 is also a lifeboat entity that monitors an availability or an other characteristic of a next entity in the chain. The first workload entity 353, for example, performs lifeboat monitoring services for the second workload entity 355; the second workload entity 355, in turn, performs lifeboat monitoring services for the third workload entity 357; and so forth. Unlike embodiments of FIG. 3C, the eighth entity 367 is directly connected to the first entity 353, so the eighth entity 367 may perform lifeboat monitoring services for the first entity 353.

As in FIG. 3C, each entity 353-367 may communicate with the system-management entity 351, but here, all may communicate bidirectionally, as did the entities of FIG. 2 and FIG. 3B.

The topology of FIG. 3D may be scaled to any number of workload/lifeboat entities by increasing the number of entities comprised by the loop. Here, unlike the topology of FIG. 3C, full symmetry may be maintained, with each entity of the plurality 353-367 acting both as a workload entity and as a lifeboat entity, and with each entity monitoring the next entity of the plurality. System-management entity 351 may comprise combinations of more than one processor, virtual machine, or other types of entity as necessary to properly manage or maintain the workload and lifeboat entities with which it communicates.

In other ways, embodiments of FIG. 3D may conform to methods of the present invention described above and in FIGS. 1-3C.

What is claimed is:

1. A method for maintaining a cluster of virtual machines, wherein the cluster comprises a first virtual machine and a second virtual machine, wherein a first agent running on the first virtual machine monitors a first operation of the second virtual machine, and wherein a second agent running on the second virtual machine monitors a second operation of the first virtual machine, the method comprising:
a processor of a computer system receiving notice from the first agent that the second virtual machine is not operating properly;
the processor attempting to restart the second virtual machine;
the processor, if failing to restart the second virtual machine, receiving further notice from the first agent that the restarting has failed;
the processor, in response to the further notice, further attempting to recreate the second virtual machine;
the processor receiving additional notice from the first agent that the recreating has failed; and
the processor alerting a system administrator that the recreating has failed.

2. The method of claim 1, wherein the second agent monitors the second operation through a passive mechanism that comprises the second agent detecting evidence that the first agent is monitoring the second virtual machine.

3. The method of claim 1, wherein:
the processor halts the restarting of the second virtual machine if the processor receives subsequent notice from the first agent that the second virtual machine has begun operating properly, wherein the processor receives the subsequent notice during the period after the first agent attempts to notify the processor that the second virtual machine is not operating properly and before the processor begins to take steps to restart the second virtual machine.

4. The method of claim 1, wherein the second agent further monitors a third operation of a third virtual machine comprised by the cluster, the method further comprising:
the processor receiving notice from the second agent that the third virtual machine is not operating properly; and
the processor taking steps to restart the third virtual machine.

5. The method of claim 1, further comprising providing at least one support service for at least one of creating, integrating, hosting, maintaining, and deploying computer-readable program code in a computer system, wherein the program code in combination with the computer system is configured to implement the provisioning, further provisioning, receiving notice, attempting, receiving further notice, further attempting, receiving additional notice, and alerting.

6. A computer program product, comprising a computer-readable hardware storage device having a computer-readable program code stored therein, the program code configured to be executed by a processor of a computer system to implement a method for maintaining a cluster of virtual machines, wherein the cluster comprises a first virtual machine and a second virtual machine, wherein a first agent running on the first virtual machine monitors a first operation of the second virtual machine; and wherein a second agent running on the second virtual machine monitors a second operation of the first virtual machine, the method comprising:
the processor receiving notice from the first agent that the second virtual machine is not operating properly;
the processor attempting to restart the second virtual machine;
the processor, if failing to restart the second virtual machine, receiving further notice from the first agent that the restarting has failed;
the processor, in response to the further notice, further attempting to recreate the second virtual machine;
the processor receiving additional notice from the first agent that the recreating has failed; and
the processor alerting a system administrator that the recreating has failed.

7. The program product of claim 6, wherein the second agent monitors the second operation through a passive mechanism that comprises the second agent detecting evidence that the first agent is monitoring the second virtual machine.

8. The program product of claim 6, wherein
the processor halts the restarting of the second virtual machine if the processor receives subsequent notice from the first agent that the second virtual machine has begun operating properly, wherein the processor receives the subsequent notice during the period after the first agent attempts to notify the processor that the second virtual machine is not operating properly and before the processor begins to take steps to restart the second virtual machine.

9. The program product of claim 6, wherein the second agent further monitors a third operation of a third virtual machine comprised by the cluster, the method further comprising:
the processor receiving notice from the second agent that the third virtual machine is not operating properly; and
the processor taking steps to restart the third virtual machine.

10. A computer system comprising a processor, a memory coupled to the processor, and a computer-readable hardware storage device coupled to the processor, the storage device containing program code configured to be run by the processor via the memory to implement a method for maintaining a cluster of virtual machines, wherein the cluster comprises a first virtual machine and a second virtual machine, wherein a first agent running on the first virtual machine monitors a first operation of the second virtual machine, and wherein a second agent running on the second virtual machine monitors a second operation of the first virtual machine, the method comprising:
the processor receiving notice from the first agent that the second virtual machine is not operating properly;
the processor attempting to restart the second virtual machine;
the processor, if failing to restart the second virtual machine, receiving further notice from the first agent that the restarting has failed;
the processor, in response to the further notice, further attempting to recreate the second virtual machine;
the processor receiving additional notice from the first agent that the recreating has failed; and
the processor alerting a system administrator that the recreating has failed.

11. The system of claim 10, wherein the second agent monitors the second operation through a passive mechanism that comprises the second agent detecting evidence that the first agent is monitoring the second virtual machine.

12. The system of claim 10, wherein
the processor halts the restarting of the second virtual machine if the processor receives subsequent notice from the first agent that the second virtual machine has begun operating properly, wherein the processor receives the subsequent notice during the period after the first agent attempts to notify the processor that the second virtual machine is not operating properly and before the processor begins to take steps to restart the second virtual machine.

13. The system of claim 10, wherein the second agent further monitors a third operation of a third virtual machine comprised by the cluster, the method further comprising:
the processor receiving notice from the second agent that the third virtual machine is not operating properly; and
the processor taking steps to restart the third virtual machine.

* * * * *